United States Patent [19]

Liberman et al.

[11] Patent Number: 4,938,674
[45] Date of Patent: Jul. 3, 1990

[54] EXTRUDER HEAD FOR MAKING ANTICORROSIVE TUBULAR POLYMERIC FILM

[76] Inventors: Semen Y. Liberman, ulitsa B.Khmelnitskogo, I08, kv.27.; Igor M. Vertyachikh, ulitsa P.Brovki, 25, kv.84., both of USSR, Gomel, U.S.S.R.

[21] Appl. No.: 328,170
[22] Filed: Mar. 24, 1989
[51] Int. Cl.⁵ ............................... B29D 23/22
[52] U.S. Cl. .................. 425/72.1; 264/209.3; 264/210.4; 264/211.13; 264/565; 425/94; 425/104; 425/326.1
[58] Field of Search ............. 425/72.1, 326.1, 387.1, 425/94, 104, 404; 264/209.3, 210.4, 211.13, 209.6, 563–565

[56] References Cited

U.S. PATENT DOCUMENTS

| | | | |
|---|---|---|---|
| 2,966,700 | 1/1961 | Dyer et al. | 425/326.1 X |
| 3,069,727 | 12/1962 | Shramek | 264/209.6 X |
| 3,714,309 | 1/1973 | Biglano | 264/563 |
| 3,902,832 | 9/1975 | Gregory et al. | 425/72.1 |
| 4,019,843 | 4/1977 | Zimmermann | 425/326.1 X |
| 4,105,380 | 8/1978 | Zimmermann | 425/326.1 X |
| 4,473,527 | 9/1984 | Fujisaki et al. | 425/326.1 X |
| 4,627,805 | 12/1986 | Schnell | 425/72.1 |

FOREIGN PATENT DOCUMENTS

| | | | |
|---|---|---|---|
| 722779 | 3/1980 | U.S.S.R. | |
| 859181 | 8/1981 | U.S.S.R. | |
| 2188274 | 9/1987 | United Kingdom | 425/72.1 |

*Primary Examiner*—Richard L. Chiesa
*Attorney, Agent, or Firm*—Lilling & Greenspan

[57] ABSTRACT

An extruder head for making an anticorrosive tubular polymeric film has a body having an extrusion die, a hollow core mounted in the body and extending through the extrusion die, a molding passage terminating in an annular opening. Chambers are defined in the body of the core and die in the zone of the annular opening, the core chamber communicating with a passage for supplying a corrosion inhibitor, A pipe for supplying compressed air is provided in the interior of the core for blowing polymer melt into a tube. A scroll having a tangential nozzle for supplying compressed air is secured to one end of the pipe and is provided with a diaphragm in the form of a converting tube coaxial therewith and communicating with the chamber of the extrusion die. The other end of the pipe is made in the form of an opening-forming diverging tube.

3 Claims, 1 Drawing Sheet

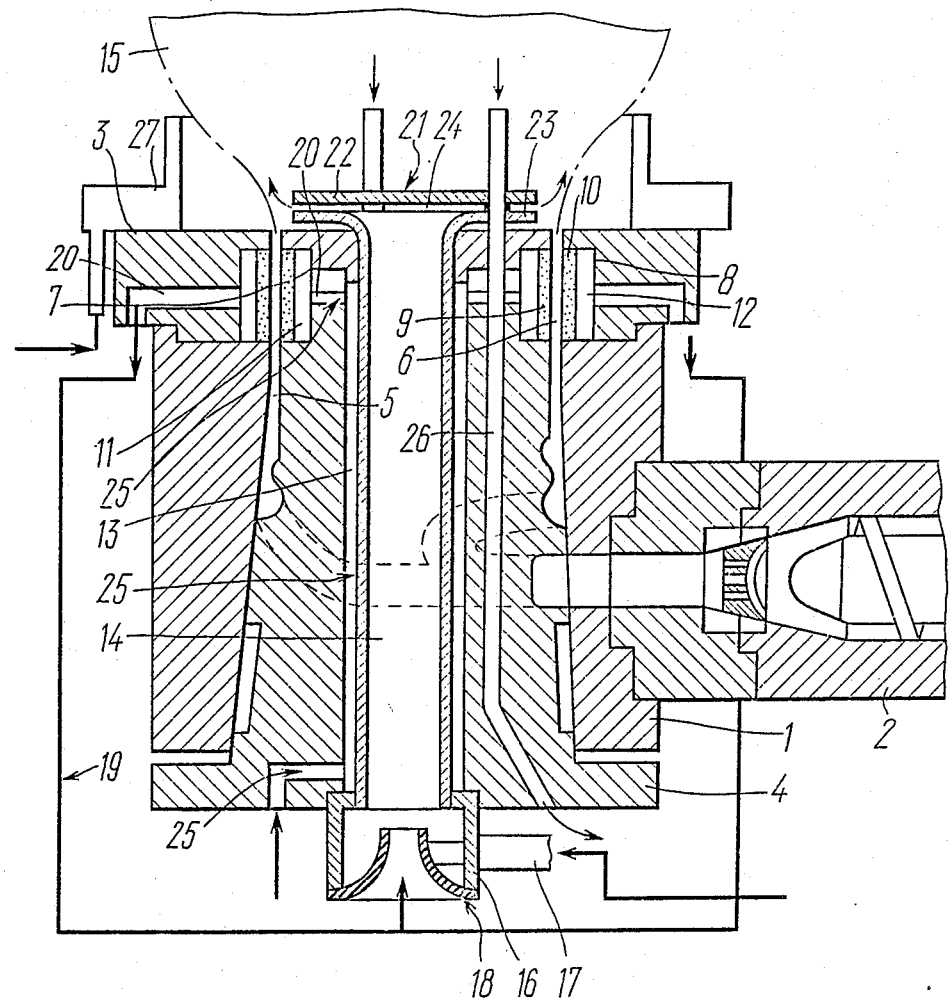

EXTRUDER HEAD FOR MAKING ANTICORROSIVE TUBULAR POLYMERIC FILM

FIELD OF THE INVENTION

The invention relates to apparatuses for making anticorrosive polymeric materials for insulating metal products from weathering factors and aggressive media, and in particular, it deals with an extruder head for making anticorrpsive tubular polymeric film.

An extruder head according to the invention makes it possible to manufacture a film which may be used in combined preservation and wrapping of metal products in the mechanical engineering, machine tool manufacture, instrumentation and tooling engineering and in other industries.

BACKGROUND OF THE INVENTION

Known in the art is an extruder head for making anticorrosive tubular polymeric film (SU, A, 859178), comprising a body and a hollow core accommodated therein, the walls of the body and core defining a molding passage. An insert is mounted in the interior of the core coaxially therewith, the insert protruding from the end face of the core and having a passage for supplying compressed air laden with finely divided powder. The protruding portion of the insert has radial ports communicating with the passage. Polymer melt is supplied from the extruder to the molding passage of the extruder head and is blown at the outlet thereof with the aid of the compressed air laden with powder which is supplied from the core passage through the radial ports. The extruder head of this type cannot impart desired anticorrosive properties to the tubular film since a part of the powder is lost during application, and inhibition is non-uniform. In addition, saturation of the film with the pulverulent inhibitor is hampered because the inhibitor does not substantially diffuse into the body of the film and is only deposited on the surface.

Known in the art is an extruder head for making anticorrosive tubular polymeric film (SU, A, 722779), comprising a hollow body with an extrusion die, a core mounted in the body and extending through the extrusion die, the outer surface of the core defining with the inner surfaces of the body and extrusion die a molding passage terminating in an annular opening, circular grooves being provided in the zone of the opening in the body of the core and extrusion die which have their open sides facing towards each other and which receive liners made of a material permeable for a corrosion inhibitor or its solution in a plastisizer, the inner walls of the linear and the walls of the groove defining chambers. The body and the core are made with passages communicating with the chambers of the extrusion die and core, respectively, for supplying a liquid lubricant thereto, and a passage being provided in the body of the core for supplying compressed air for blowing polymer melt into a tube.

A liquid lubricant is supplied under pressure to the polymer melt fed from the extruder into the molding passage when it flows through the annular opening from the chambers of the extrusion die and core so as to form a uniform layer on the surface of the melt along the opening. The polymer melt supplied from the extruder is in the form of a mixture of a thermoplastic with a corrosion inhibitor.

The use of the lubricant ensures a reduction of coefficient of friction of thermoplastic melt with the opening walls and makes it possible to process heavily-filled thermoplastics. The liquid lubricant does not have any effect on the anticorrosive properties of the film. The tubular film made with the aid of the extruder head of this type does not have the desired complex of anticorrosive properties as corrosion inhibitor in encapsulated in the thermoplastic and its release into the body of the tube is hampered so that quality of the film is rather low.

SUMMARY OF THE INVENTION

It is an object of the invention to provide an extruder head for making anticorrosive tubular polymeric film which improves anticorrosive properties of the film while retaining its high physico-mechanical characteristics.

This object is accomplished by that there is provided an extruder head for making anticorrosive tubular polymeric film, comprising a hollow body having an extrusion die, a core mounted in the body and extending through the extrusion die, the outer surface of the core defining with the inner surface of the body and die a molding passage terminating an annular opening, annular grooves having their open sides facing towards each other being made in the zone of the annular opening and receiving liners made of a material permeable for a corrosive inhibitor or its solution in a plasticizer, the inner walls of the liners defining chambers with the walls of the grooves, wherein, according to the invention, the core is made with an interior space accommodating a cylindrical pipe coaxial therewith for supplying compressed air for blowing the polymer melt into a tube, a scroll being secured with its end face to one end of the pipe, the scroll communicating with the pipe and being coaxial therewith and having at least one tangential nozzle for supplying compressed air, and wherein a diaphragm is provided at the other end face of the scroll remote from the pipe in in the form of a converging tube communicating with the die chamber, the other end of the pipe being in the form of a diverging tube and having a blind wall extending perpendicularly with respect to the axis of the pipe and defining an opening with the wall of the diverging tube, the core having at least one passage communicating with its chamber for supplying a corrosion inhibitor or its solution in a plasticizer.

This construction of the extruder head ensures an increase in the depth of penetration and uniformity of distribution of a corrosion inhibitor in the polymer melt and formation of such a structure of the tubular film in which release of corrosion inhibitor will only take place on the inner side of the tube surface so as to substantially enhance its anticorrosive characteristics. This film has food physico-mechanical properties owing to its structure.

To control the amount of vacuum in the pipe, it is preferred to make the blind wall movable axially along the pipe. To optimize heat exchange processes occurring during molding of the tubular film, it is preferred that a part of the passage for supplying a corrosion inhibitor or its solution in a plasticizer to the core chamber be defined by the surface of the interior space of the core and the outer surface of the pipe, the other part of the passage being provided in the core body.

BRIEF DESCRIPTION OF THE DRAWINGS

A specific embodiment of an extruder head according to the invention for making anticorrosive tubular polymeric film will now be described with reference to the accompanying drawing schematically showing a general view, in longitudinal section, of an extruder head according to the invention.

DETAILED DESCRIPTION OF THE INVENTION

An extruder head (see the FIGURE) comprises a hollow body attached to an extruder 2 and an extrusion die 3 mounted on the body. A core 4 is mounted in the body 1 and extends through the extrusion die 3, the outer surface of the core 4 defining with the inner surface of the body 1 a molding passage 5 and with the inner surface of the die 3 an annular molding opening 6. Annular grooves 7, 8 having their open sides facing towards each other are made in the body of the core 4 and dies 3 in the zone of the opening 6. Liners 9, 10 made of a material permeable for a corrosion inhibitor or its solution in a plasticizer, e.g. of a porous cement material are provided in the grooves 7, 8. The inner walls of the liners 9, 10 and the walls of the grooves 7, 8 define a chamber 11 of the core 4 and a chamber 12 of the dies 3, respectively. The outer walls of the liners 9, 10 form part of the walls of the die 3. The core is made with an interior space 13 which accommodates a cylindrical pipe 14 coaxial with the core for supplying compressed air for blowing polymer melt into a tube 15. A scroll 16 has one end face thereof secured to one end of the pipe 14 coaxially therewith. The scroll 16 has at least one tangential nozzle 17 for supplying compressed aid. A diaphragm in the form of converging tube coaxial with the scroll is provided at the other end face of the scroll remote from the pipe 14, the converging tube communicating through a conduit 19 and a passage 20 in the body of the die 3 with the die chamber 12. The other end of the pipe 14 is made in the form of a diverging tube 21 and is provided with a blind wall 22 extending perpendicularly with respect to the pipe axis defining with a wall 23 of the diverging tube 21 air opening 24. The blind wall 22 is movable axially along the pipe 14. The cylindrical pipe 14 in combination with the scroll 16 and diverging tube 21 define a vertical pipe and form a passage for supplying compressed air for blowing polymer melt into the tube 15. The core 14 has at least one passage 25 communicating with its chamber 11 for supplying a corrosion inhibitor or its solution in plasticizer thereto. A part of the passage 25 is defined by the surface of the interior space 13 of the core 4 and the outer surface of the pipe 14 and the other part is provided in the body of the core 4. For discharging air from the interior of the tube 15, a passage 26 is provided in the body of the core 4 which extends through spacer sleeves (not shown) of the diverging tube 21 and core 4. An annular manifold 27 is provided above the extrusion die 3 for cooling the tube 15. The extruder head according to the invention functions in the following manner.

Polymer melt is supplied from the extruder 2 to the molding passage 5 and is forced therealong to be admitted to the molding annular opening 6. When the polymer melt passes through the opening 6, it is acted upon with a corrosion inhibitor or its solution in a plasticizer fed under pressure from the passage 25 through the chamber 11 and the permeable liner 9.

The corrosion inhibitor penetrates the body of the melt only on the side of the inner surface of the polymeric tube 15 formed at the outlet of the extruder head. At the same time, compressed air is supplied to the tangential head 17 of the scroll 16. The air forms an intensive circular flow in the scroll 16 so that a vortex is admitted to the pipe 14. A swirling action occurs so that the peripheral layers of the air flow are heated and the axial layers are substantially cooled down. The vortical air flow escapes from the opening 24 of the diverging tube 21 under pressure and blows the polymer melt escaping from the opening 6 to form the tube 15. The heated peripheral layer of the air flow gives up its heat to the corrosion inhibitor or its solution in plasticizer available in the passage 25 which functions as heat carrier for additional heating of the core 4. The opening-forming diverging tube 21 ensures a material pressure reduction at the axis of the vortex so as to provide for a self-vacuum effect of the "vortical" pipe 14. As the diverging tube 21 has the blind wall 22, air is sucked in the axial area through the converging tub tube 18 of the scroll 16. As the converging tube 18 communicates with the chamber 12 of the die 3 through the conduit 19 and passage 20, the interior of the chamber 12 is evacuated, and the extruded melt is also vacuum treated through the permeable liner 10. This facility, in the first place contributes to degassing of the polymer melt and to filling of the vacant pores with the corrosion inhibitor or its solution in the plasticizer so as to enhance physicomechanical characteristics of the tubular film (pressure of the corrosion inhibitor on the one hand and vacuum on the other hand) so as to substantially raise the rate of diffusion of the inhibitor into the continuously extruded polymer melt. The depth of penetration of the inhibitor into the body of the tube increases and on the one side only at that, i.e. a structure of the tubular film is formed in which the inhibitor will be released towards the material being preserved when used. Owing to a change in pressure differential at the surface of the polymer melt, a tubular film with a pre-set depth of penetration and desired concentration of the corrosion inhibitor thickwise of the film can be made. The air used for blowing the tube is discharged through the passage 26. By moving axially the blind wall 22 of the diverging tube 21, the amount of vacuum in the chamber 8 can be controlled so as to control the depth of diffusion into the body of the film. The polymeric film is cooled down externally with air supplied to the annular manifold 27.

The extruder head according to the invention makes it possible to make a tubular film of a structure which materially enhances its anticorrosive properties owing to the release of the corrosion inhibitor into the interior of the tube only and owing to its high concentration thickness of the film, the strength characteristics of the film being also enhanced. The film has properties of a double-layer film without deformation or separation into layers during storage.

We claim:

1. An extruder head for making an anticorrosive tubular polymeric film, comprising:
   a hollow body;
   an extrusion die mounted on said body;
   a core mounted in said body and extending through said die;
   a molding passage defined by the inner surface of said body and outer surface of said core;
   an annular molding opening defined by the inner surface of said die and outer surface of said core;
   annular grooves in the body of said core and die having their open sides facing towards each other, said grooves being located in the zone of said annular molding opening;

a liner of a material permeable for a corrosive inhibitor or its solution in a plasticizer mounted in said grooves;

a chamber of said core defined by walls of said groove of the core and the inner wall of said liner mounted in said groove;

a chamber of said extrusion die defined by walls of said groove in said die and the inner wall of said liner mounted in said groove;

a cylindrical pipe for supplying compressed air for blowing polymer melt into a tube, said pipe being mounted in said interior space of said core, one end of the pipe being in the form of a diverging tube and being provided with a blind wall extending perpendicularly with respect to the pipe axis to define an opening with the wall of the diverging tube;

a scroll having at least one tangential nozzle for supplying compressed air, the scroll having one end face thereof secured to an end of said pipe which is remote from said diverging tube, communicating with the pipe and extending coaxially therewith, a diaphragm in the form of a converging tube coaxial with the scroll communicating with said chamber of the die being provided at the other end of the scroll remote from said pipe;

at least one passage for supplying a corrosion inhibitor or its solution in a plasticizer communicating with said chamber of the core.

2. An extruder head according to claim 1, wherein said blind wall is movable axially along said pipe.

3. An extruder head according to claim 1, wherein a part of said passage for supplying a corrosion inhibitor or its solution in a plasticizer to said core chamber is defined by the surface of said interior space of said core and the outer surface of said pipe, and another part being provided in the body of said core.

* * * * *